United States Patent
Donavalli et al.

(10) Patent No.: US 9,972,004 B1
(45) Date of Patent: May 15, 2018

(54) PROXIMITY-BASED MOBILE DEVICE PAYMENTS

(71) Applicant: Amazon Technologies, Inc., Seattle, WA (US)

(72) Inventors: Venkat Sasank Donavalli, Seattle, WA (US); Vasanth Narendranath Petlu, Seattle, WA (US); Harshawardhan Chiplonkar, Issaquah, WA (US); Jonathan Uy Hatol, Woodinville, WA (US); Gregory Louis Chappell, Luxembourg (LU); Robert Serr, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/500,891

(22) Filed: Sep. 29, 2014

(51) Int. Cl.
*G06Q 20/32* (2012.01)
*G06Q 20/20* (2012.01)
*G06Q 20/40* (2012.01)

(52) U.S. Cl.
CPC ........ *G06Q 20/3224* (2013.01); *G06Q 20/20* (2013.01); *G06Q 20/40* (2013.01)

(58) Field of Classification Search
CPC ................................................ G06Q 20/3224
See application file for complete search history.

(56) References Cited

U.S. PATENT DOCUMENTS

2014/0279085 A1* 9/2014 Ahmad .............. G06Q 30/0641
705/15

OTHER PUBLICATIONS

Tabbed Out: Pay Your Tab with Your Phone [online]. ATX Innovation, Inc., Aug. 31, 2014 [retrieved on Sep. 11, 2014]. Retrieved from the Internet: <URL: www.tabbedout.com>. 4 pages, plus publication date addendum.

* cited by examiner

*Primary Examiner* — Russell S Glass
(74) *Attorney, Agent, or Firm* — Kilpatrick Townsend & Stockton LLP

(57) ABSTRACT

In some examples, by communicating with a mobile payment service, a user of a mobile device may settle his or her bill with a business using the mobile device. The business may be configured with a beacon to determine when the user's mobile device is near the business and a point-of-sale device to manage user orders and communicate with the mobile payment service. In response to a request by the mobile device, the mobile payment service may debit a user account associated with the mobile device for items purchased at the business. In turn, the mobile payment service may pay the business for the items purchased at the business. In some examples, the bill may be divided among a plurality of users corresponding to a plurality of mobile devices. And, portions of the bill may be provided to individual mobile devices of the plurality of mobile devices.

19 Claims, 9 Drawing Sheets

PROXIMITY-BASED MOBILE DEVICE PAYMENTS

BACKGROUND

A business entity may be associated with a particular physical location and may provide a variety of items, including goods and services, for purchase by customers of the business entity. In a typical transaction, a customer may visit the physical location of the business entity, select a particular item provided by the business entity, and pay for the item using one of a variety of different means of payment accepted by the business entity. The business entity may accept, for example, payment via cash, a credit card, a debit card, a check, a charge account, a bank transfer, trade, or other the like.

BRIEF DESCRIPTION OF THE DRAWINGS

Various embodiments in accordance with the present disclosure will be described with reference to the drawings, in which.

DETAILED DESCRIPTION

Figure 1:
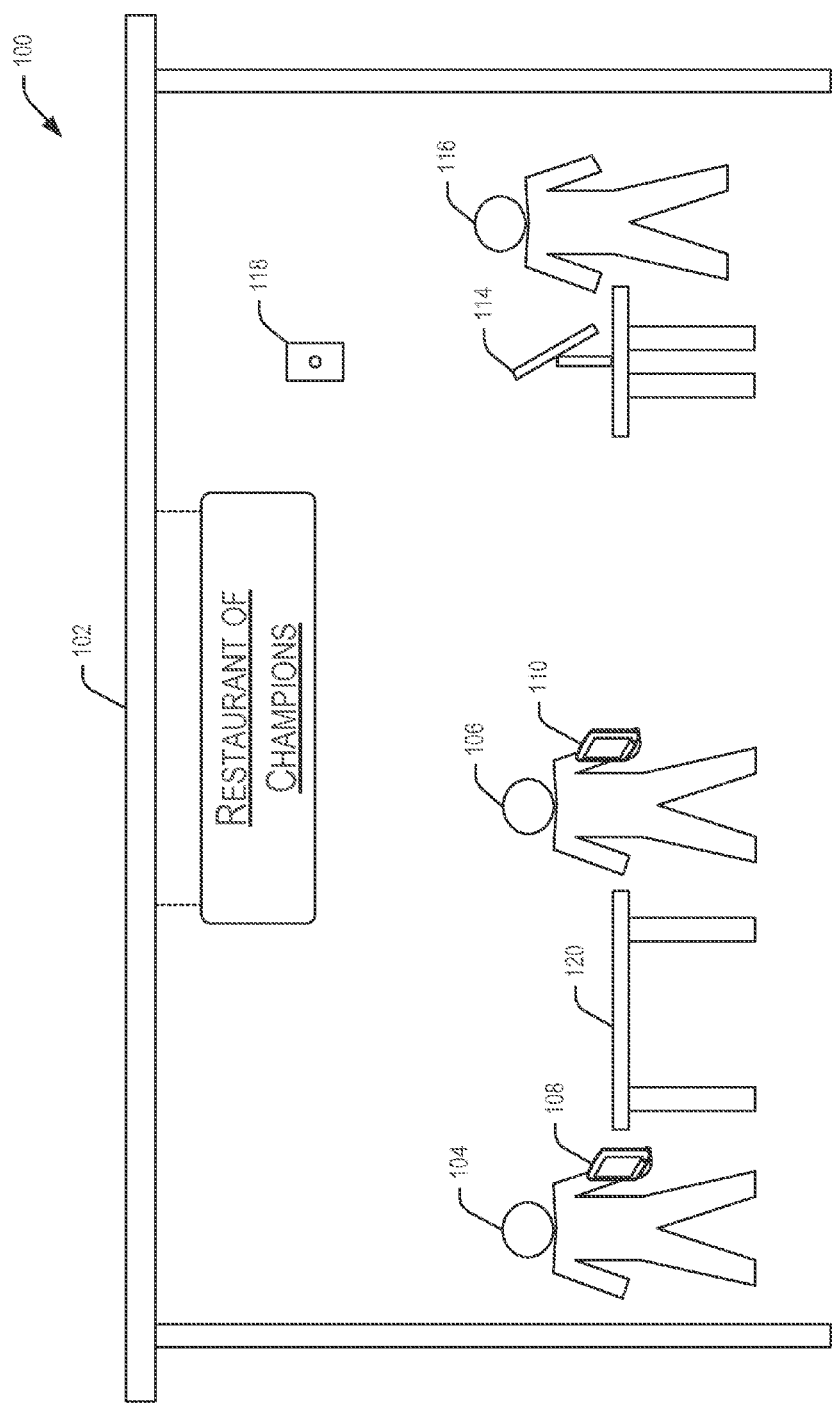
FIG. 1 is an example environment for implementing techniques relating to proximity-based mobile device payments as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present specification are directed to, among other things, techniques relating to proximity-based mobile device payments. In particular, within this specification will be discussed techniques relating to the purchase of items, such as goods and services, from a business entity associated with a physical location, and payment for the items using mobile devices. In accordance with techniques described herein, a business entity may be enabled to determine characteristics (e.g., identity) of customers that are located within a certain proximity (e.g., within the business entity) of the business entity by communicating with the customers' mobile devices. For example, a beacon associated with the business entity may transmit a signal (e.g., according to the Bluetooth® standard) that, when detected by a customer's mobile device, may ask the customer whether he or she wants to "check in" at the business entity. Checking in at the business entity may enable the customer to utilize the techniques relating to proximity-based mobile device payments to settle a transaction. In some examples, detecting the signal by the mobile device may cause the mobile device to communicate with a mobile payment service (with or without checking in).

The mobile payment service may be operated by an entity other than the business entity and may be configured to process payment transactions between the customer and the business entity. For example, the customer may select an item from the business entity and provide an indication to the business entity that the customer desires to settle a payment for the item via the mobile device. Based on this, the mobile payment service may settle the payment transaction between the customer and the business entity by accepting payment from the customer via the mobile device (e.g., from the customer's account associated with the mobile device and the mobile payment service) and providing payment to the business entity (e.g., by communicating with a network including a point-of-sale device). In this manner, the customer may complete the payment transaction using his or her mobile device. In some examples, payment for an item at a particular business location may be split between two or more mobile devices. The mobile payment service may process each payment independently, but may provide payment to the business location in one single payment. In this manner, the business location may be unaware that the payment was split between two or more mobile devices.

In one example, a user may download and install an application on the user's mobile device. The application may include functionality to enable the user to interact with a mobile payment service and to authorize payment for certain items using the mobile payment service. Meanwhile, a restaurant may be configured to include a point-of-sale device capable of communicating with the mobile payment service. As the user (and the user's mobile device) comes within a certain distance of the restaurant, the mobile device may receive a signal from a beacon associated with the restaurant. Once the signal has been received, the user may be asked whether he or she would like to check in at the restaurant. Checking in at a location, such as the restaurant, may entitle the user to certain benefits such as receiving certain promotional offers, allowing payment using the mobile device in connection with the mobile payment service, or the like. Next, whether or not checked in, the customer may provide his or her order (e.g., dinner) to a waiter who, in turn, may enter the order at a point-of-sale device and fulfill the order by delivering the dinner to the customer. Meanwhile, the point-of-sale device may provide a bill associated with the order to the mobile payment service. The mobile payment service may retain the bill until the user decides to checkout. Upon checkout, the user may simply leave the restaurant and can be automatically prompted to pay the bill using the mobile payment service. This may include debiting an account of the customer associated with the mobile payment service. The mobile payment service may then settle the bill with the restaurant by providing and/or authorizing payment. In some examples, the bill may be split between two or more users. When a bill is split, each device (e.g., one for each user) may receive an indication of a respective portion of the bill. Even though the bill may have been split, the mobile payment service may provide a single payment to the restaurant via communication with the point-of-sale device.

Turning now to the figures, FIG. 1 illustrates environment 100 for implementing techniques relating to proximity-based mobile device payments as described herein, according to at least one example. The environment 100 may include a business location 102 called "Restaurant of Champions." The business location 102 may include a beacon 118, a point-of-sale device 114, and a waiter 116. In some examples, the point-of-sale device 114 may be configured to communicate with a mobile-payment service (not shown). The mobile payment service may be configured to process payments for transactions conducted at the business location 102. The waiter 116 may take orders from customers, such as customer 104 and customer 106, and enter the orders into the point-of-sale device 114. The customer 104 and the customer 106 may carry their respective mobile devices 108 and 110 with them while at the business location 102. In some examples, the mobile devices 108 and 110 may be any suitable mobile device as discussed in more detail below.

The mobile devices 108 and the customer 104 will now be discussed as examples of both the customers 104, 106 and the mobile devices 108, 110. The mobile device 108 may be configured to receive beacon information from the beacon 118 of the business location 102. In some examples, the beacon 118 may include a beacon capable of transmitting a wireless signal (e.g., Bluetooth®) and the beacon information may include wireless signals or transmissions transmitted by the beacon 118. In some examples, the beacon 118 may include more than one beacon located throughout the business location 102. For example, each table of the business location 102, including table 120, may include a unique beacon. Each beacon may be associated with its respective table. In this manner, the progress of service (e.g., interactions between the waiter 116 and the customers 104, 106) within the business location 102 may be tracked. For example, the point-of-sale device 114 may be a mobile device that the waiter 116 may carry and may be tracked as the waiter 116 moves throughout the business location 102. For example, visits to the table 120 during a dining experience, the time between visits, the time the food is delivered and other similar interaction information may be logged and used by the customers 104, 106 in determining tip amounts. For example, if the waiter 116 visits the table 120 more than 5 times during a meal, then the tip amount may be 20%. However, if the waiter 116 visits less than 2 times during a meal, then the tip amount may be 10%. Such ranges for tips may be set as defaults or preferences. Such information may also be used by a proprietor of the business location 102 for quality control or by the mobile payment service. In some examples, a beacon, such as the beacon 118, may be included in the point-of-sale device 114. In some examples, the mobile device 108 may use the beacon information to inform the mobile payment service that the customer 104 is located at or within a threshold distance (e.g., within a threshold signaling distance from the beacon 118) from the business location 102. The mobile payment service may then notify the business location 102 via the point-of-sale device 114 that the customer 104 is at the business location 102 with the mobile device 108. Such informing may take place in response to the customer 104 checking in at the business location 102 using the mobile device 108. In some examples, checking in may be automatic. Moreover, other types of location-based information (e.g., global-positioning system information, network triangulation, and any combination of the foregoing, including beacon information) may be used may be used to determine whether the customer 104 is at or near the business location 102.

Once at the business location 102, the customer 104 and the customer 106 may place an order for items available at the restaurant. After taking the order from the customer 104 and the customer 106, the waiter 116 may enter the order at the point-of-sale device 114. The order may be associated with a bill amount in the form of a tab, an account, or other similar accounting function. Using techniques described in more detail herein, the customer 104 and the customer 106 may be enabled to settle the bill amount using their respective mobile devices 108, 110. Such settlement may take place without waiting for the waiter 116 to return with a bill, and may even take place after the customer 104 and the customer 106 have left the business location 102. Thus, the customer 104 and the customer 106 may be enabled to more conveniently settle transactions than by using conventional methods. In some examples, the customer 104 and the customer 106 may split the bill amount without regard to the business location 102 being aware of the split. In other words, the customer 104 and the customer 106 may pay for separate portions of a single order and the mobile payment service may provide a single payment to the business location 102 (e.g., by communicating with the point-of-sale device 114) irrespective of the splitting.

Figure 2:
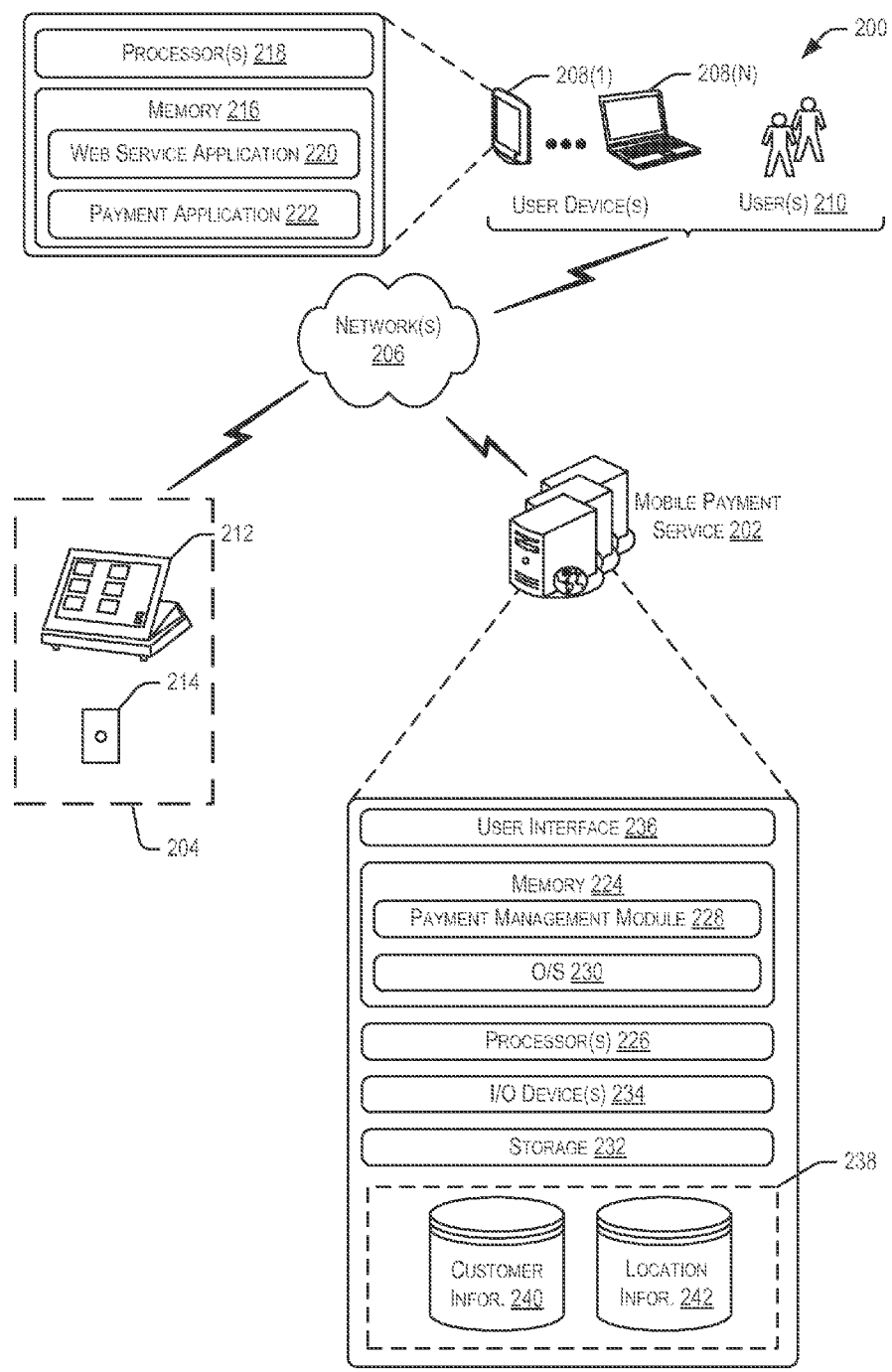
FIG. 2 is an example schematic architecture for implementing techniques relating to proximity-based mobile device payments as described herein, according to at least one example.

Turning next to FIG. 2, in this figure is illustrated an example architecture 200 for implementing techniques relating to proximity-based mobile device payments as described herein, according to at least one example. The architecture 200 may include a mobile payment service 202. The mobile payment service 202 may be included as part of an electronic marketplace (not shown) and may interface with elements of the architecture 200 to implement the techniques described herein. In some examples, the mobile payment service 202 may be a stand-alone service operated on its own or in communication with an electronic marketplace. In some examples, the mobile payment service 202 may be in communication with a third-party payment processing service. The mobile payment service 202 may be in communication with a business location 204 (e.g., the business location 102) and one or more user devices 208(1)-208(N) (hereinafter, "the user device 208") (e.g., the user devices 108, 110) via one or more network(s) 206 (hereinafter, "the network 206"). The network 206 may include any one or a combination of many different types of networks, such as cable networks, the Internet, wireless networks, cellular networks, radio networks, and other private and/or public networks.

Turning next to the details of the business location 204, the business location 204 may include a point-of-sale device 212 and a beacon 214. The point-of-sale device 212 is an example of the point-of-sale device 114 discussed with reference to FIG. 1. Additionally, the beacon 214 is an example of the beacon 118 also discussed with reference to FIG. 1. The point-of-sale device 212 may be any suitable electronic transaction terminal capable of communicating via the network 206 with the mobile payment service 202 over a wired or wireless connection. Examples of suitable electronic transaction terminals may include: computerized cash registers, tablet-based terminals, handheld terminals, personal computer-based terminals, mobile telephone-based terminals, credit card readers, and other devices capable of communicating with the mobile payment service 202. In some examples, the point-of-sale device 212 may include a user interface for inputting orders, adjusting bills and tabs, processing payments, and interacting with users according to the techniques described herein. For example, on the user interface of the point-of-sale device 212 may be presented a list of users who are checked in at the business location 204. The list of users may also include additional details (e.g., a photo or picture for each user, pre-approval status for payments for each user, and other details describing the users) about the users that have checked in are otherwise located at or near the business location 204. This additional information may be provided to the point-of-sale device 212 by the mobile payment service 202.

The point-of-sale device 212, in some examples, may be configured to run specialized software to enable it to communicate with the other elements of the architecture 200. For example, the software may have been provided to the manufacture of the point-of-sale device 212 or to a proprietor of the business location 204 in the form of a Software Development Kit (SDK). The point-of-sale SDK may include the workflows, service calls, user interfaces, and other details to enable the point-of-sale device 212 to interact in the manner described herein.

The beacon 214 may be configured to broadcast beacon information. The beacon information may be received by the user device 208 and used by the user device 208 to verify that the user device 208 is located at or near the business location 204 (or within the range of the beacon 214 which may relate to the boundaries of the business location 204). As discussed previously, the beacon 214 may broadcast beacon information according to the Bluetooth® standard, via a wireless network, or by using some other comparable signaling technology. In some examples, the beacon 214 may be excluded from the business location 204, and the user device 208 may rely on global positioning system techniques, network triangulation techniques, or other similar techniques to determine when the user device 208 is within a threshold distance from the business location 204. In some examples, the beacon 214 may be Wi-Fi-enabled. In this manner, the beacon 214 may be smart beacon or hybrid beacon. Such a beacon may be configured on the fly by the point-of-sale device 212, the mobile payment service 202, or any other suitable computing device capable of connecting to the beacon 214 over the network. When the beacon 214 is a smart beacon it may enable techniques described herein to be implemented in locations where cellular service is poor or otherwise unavailable. For example, suppose that the business location 204 is in the basement of a building where cellular network service is unavailable. The user device 208 may be enabled to receive Bluetooth® signals and wireless network signals from the beacon 214. The user device 208 may provide communications to the mobile payment service 202 via the Wi-Fi-enabled beacon 214 (instead of using the cellular network).

Turning next to the details of the user device 208, the user device 208 may be any suitable device capable of communicating with the mobile payment service 202. For example, the user device 208 may be any suitable computing device such as, but not limited to, a mobile phone, a smart phone, a personal digital assistant (PDA), a laptop computer, a thin-client device, or other computing device. In some examples, the user device 208 may be in communication with the mobile payment service 202 via one or more web servers constituting an electronic marketplace (not shown) connected to the network 206 and associated with the mobile payment service 202. The user device 208 may be utilized by the user 210 for interacting with the mobile payment service 202 and the elements of the business location 204. The user device 208 may therefore include a memory 216, a processor 218, a web-service application 220, a payment application 222, and any other suitable feature to enable communication and interaction with the features of the architecture 200. The web service application may be in the form of a web browser, an application programming interface (API), virtual computing instance, or other suitable application. In some examples, the software included in the payment application 222 may have been provided to the developer of the payment application 222 in the form of a Software Development Kit (SDK). In some examples, the payment application 222, included in the payment application SDK or otherwise, may include a user interface for enabling the user 210 to interact with the mobile payment service 202. In some examples, the payment application 222 may be configured to store one or more loyalty cards associated with different business entities, enable targeted advertising to the user 210, enable the user 210 to subscribe to certain channels associated with different business entities, and maintain other similar functionality. The payment application SDK may be provided to third-parties for integration with the third-parties' existing applications. In this manner, the mobile payment service 202 may be configured to process payments for users of the third-party applications. For example, suppose a third-party application allows users to place orders for certain goods or services. By using the payment SDK, the mobile payment service 202 may be configured to handle payment processing for orders placed by users of the third-party applications. The user device 208 may also include, embodied in the payment application 222 or otherwise, a background listener to listen for beacon information from the beacon 214. Once the user device 208 has received beacon information via the background listener, the user device 208 may prompt the user 210 to take one or more actions including, for example, checking in it at the business location 204 using the user device 208.

Turning now to the details of the mobile payment service 202, the mobile payment service 202 may include one or more service provider computers, perhaps arranged in a cluster of servers or as a server farm, and may host web service applications. These servers may be configured to host a website (or combination of websites) viewable via the user device 208 and to communicate with the point-of-sale device 212 and the user device 208. The mobile payment service 202 may include at least one memory 224 and one or more processing units (or processor(s)) 226. The processor(s) 226 may be implemented as appropriate in hardware, computer-executable instructions, software, firmware, or combinations thereof. Computer-executable instruction, software or firmware implementations of the processor(s) 226 may include computer-executable or machine-executable instructions written in any suitable programming language to perform the various functions described. The memory 224 may include more than one memory and may be distributed throughout the mobile payment service 202. The memory 224 may store program instructions (e.g., payment management module 228) that are loadable and executable on the processor(s) 226, as well as data generated during the execution of these programs. Depending on the configuration and type of memory including the mobile payment service 202, the memory 224 may be volatile (such as random access memory (RAM)) and/or non-volatile (such as read-only memory (ROM), flash memory, or other memory). The mobile payment service 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 224 may include multiple different types of memory, such as static random access memory (SRAM), dynamic random access memory (DRAM), or ROM. Turning to the contents of the memory 224 in more detail, the memory 224 may include an operating system 230 and one or more application programs, modules, or services for implementing the features disclosed herein including at least the payment management module 228.

In some examples, the mobile payment service 202 may also include additional storage 232, which may include removable storage and/or non-removable storage. The additional storage 232 may include, but is not limited to, magnetic storage, optical disks, and/or tape storage. The disk drives and their associated computer-readable media may provide non-volatile storage of computer-readable instructions, data structures, program modules, and other data for the computing devices. The memory 224 and the additional storage 232, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the payment management module 228. The modules of the mobile payment service 202 may include one or more components. The mobile payment service 202 may also include input/output (I/O) device(s) and/or ports 234, such as for enabling connection with a keyboard, a mouse, a pen, a voice input device, a touch input device, a display, speakers, a printer, or other I/O device.

In some examples, the mobile payment service 202 may also include a user interface 236. The user interface 236 may be utilized by an operator, or other authorized user to access portions of the mobile payment service 202. In some examples, the user interface 236 may include a graphical user interface, web-based applications, programmatic interfaces such as application programming interfaces (APIs), or other user interface configurations. In some examples, the user interface 236 may be used to communicate with the payment application 222. The mobile payment service 202 may also include data store 238. For example, the data store 238 may include one or more databases, data structures, or the like for storing and/or retaining information associated with the mobile payment service 202. The data store 238 may include data structures, such as customer information database 240 and location information database 242. The customer information database 240 may be used to retain information pertaining to users of the mobile payment service 202, such as the user 210. Such information may include, for example, user profile information, account details, payment processing instruments (e.g., saved credit card, saved debit cards, bank account information, and other similar payment processing instruments), payment processing details and preferences (e.g., whether an account may be charged without additional verification (e.g., "zero-click") by the user), purchase history, and other similar information pertaining to a particular user of the mobile payment service 202. The location information database 242 may include information pertaining to different locations, such as the business location 204, where the user 210 may pay for goods or services using the techniques described herein. Such location information may include, for example, a name, an address, a listing of coupons, a unique business location identifier, a list of checked-in customers, a list of frequent customers, a list of expected customers, a list of recent customers, order details for users, and other similar location information.

Figure 3:
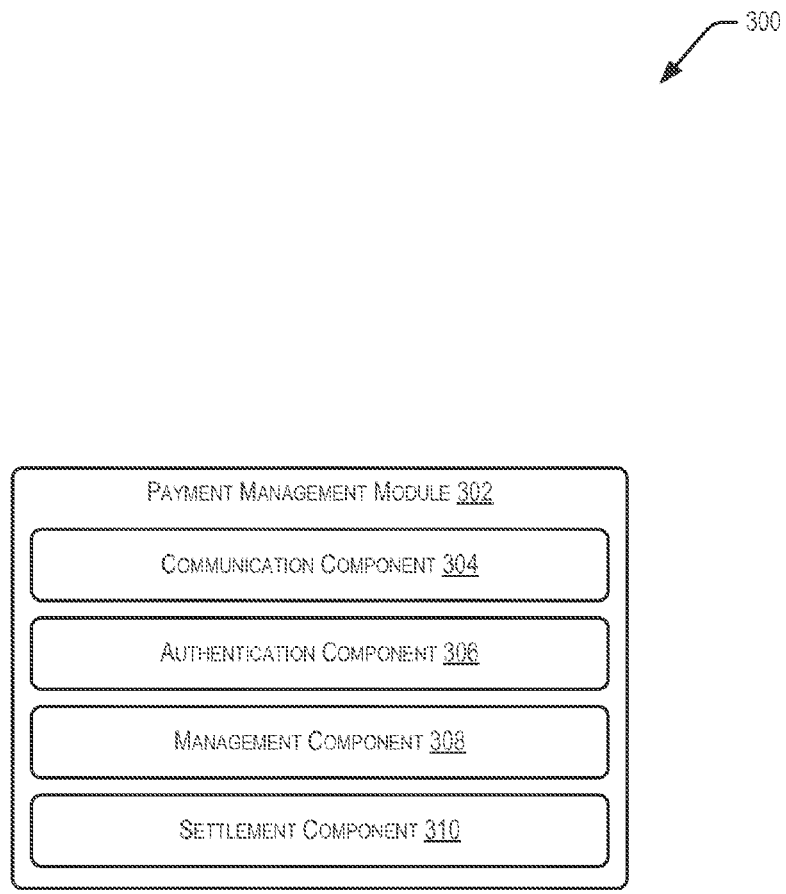
FIG. 3 is an example device for implementing techniques relating to proximity-based mobile device payments as described herein, according to at least one example.

Turning next to the details of the payment management module 228, in FIG. 3, example device 300 is illustrated including payment management module 302. The payment management module 302 is an example of the payment management module 228. The payment management module 302 may be configured to manage one or more submodules, components, and/or services directed to embodiments disclosed herein. In some examples, the payment management module 302 may include a communication component 304, an authentication component 306, a management component 308, and a settlement component 310. While these modules and components are illustrated in FIG. 3 and will be described as performing discrete tasks, it is understood that FIG. 3 illustrates example configurations and other configurations performing other tasks and/or similar tasks as those described herein may be implemented according to the techniques described herein. Other modules (not shown) may perform the same tasks as the payment management module 302 or other tasks and may be implemented in a similar fashion or according to other configurations.

Generally, the communication component 304 may be configured to manage communications between user devices and a mobile payment service, and between point-of-sale devices and the mobile payment service. In this manner, the communication component 304 may be configured to receive information from, and provide information to, user devices and point-of-sale devices for use in implementing the techniques described herein. The authentication component 306 may be configured to authenticate the identity, account, or other details of users desiring to participate in the proximity-based mobile device payment techniques described herein. In addition, the authentication component 306 may be configured to authenticate one or more point-of-sale devices and one or more human users associated with the point-of-sale devices. The authentication component 306 may be used to ensure security of the elements that participate in a proximity-based mobile device payment system. The management component 308 may be configured to manage interactions between users and the proximity-based mobile device payment system after the authentication component 306 has authenticated the parties. Finally, the settlement component 310 may be configured to settle transactions as between the mobile device payment system and users, and as between the mobile device payment system and the business locations.

Figure 4:
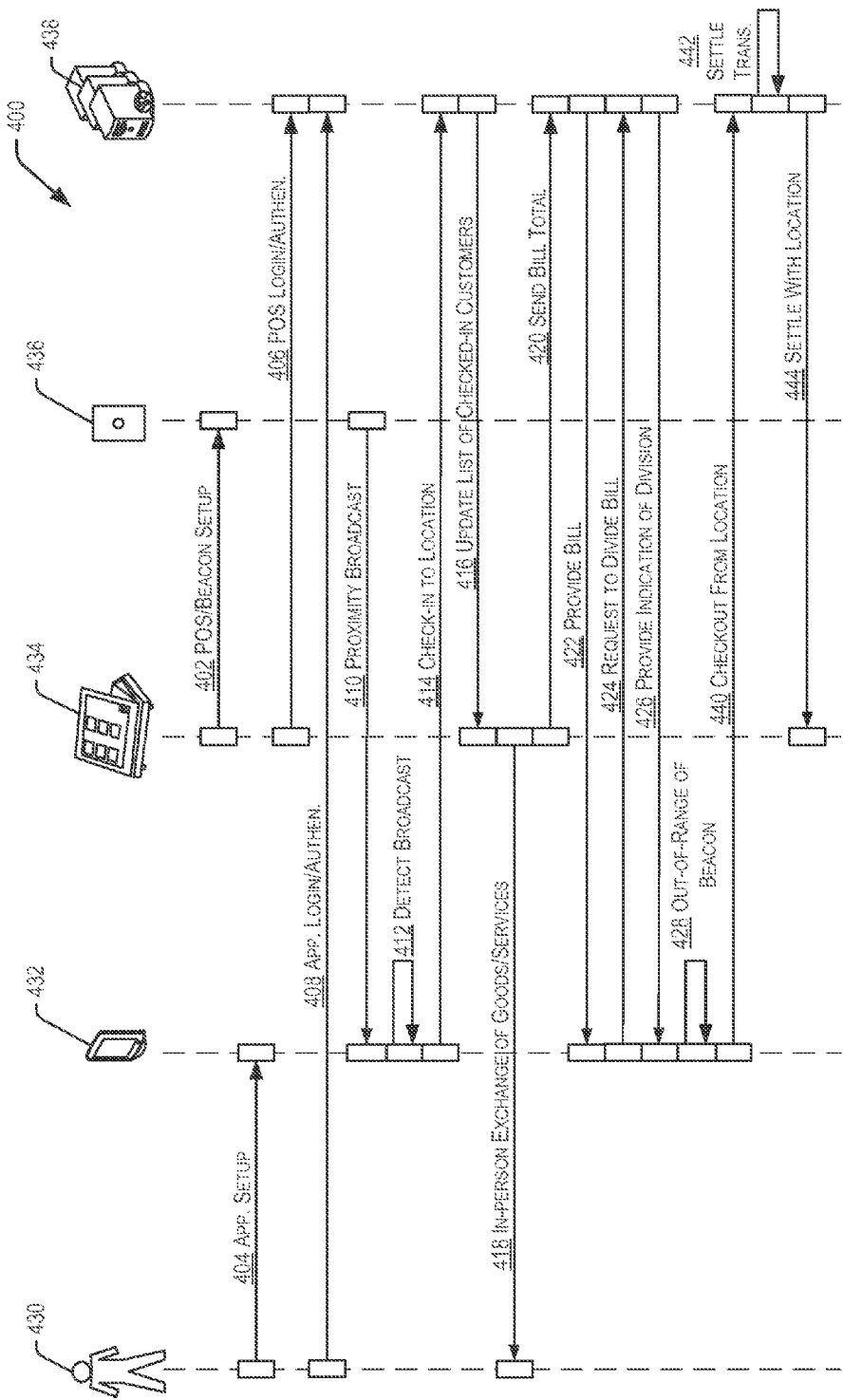
FIG. 4 is an example diagram depicting techniques relating to proximity-based mobile device payments as described herein, according to at least one example.

Turning next to FIG. 4, in which is illustrated an example diagram 400 depicting techniques relating to proximity-based mobile device payments as described herein, according to at least one example. In particular, the diagram 400 depicts an example sequence diagram including a customer 430 (e.g., the user 210), a mobile device 432 (e.g., user device 208) associated with the customer 430, a point-of-sale device 434 (e.g., the point-of-sale device 212) and a beacon 436 (e.g., the beacon 214) associated with a business location, and a mobile payment service 438 (e.g., the mobile payment service 202). The point-of-sale device 434 may represent a system of point-of-sale devices (and other computing devices) coupled to a network associated with the business location. In some examples, the sequence may begin at 402 by setting up and/or authenticating the point-of-sale device 434 and the beacon 436. This may include, for example, using the point-of-sale device 434 (or other computing device) to configure the beacon 436 to transmit beacon information. At 404, the customer 430 may install and may configure an application on the mobile device 432. In some examples, this may include the customer 430 communicating with an application marketplace, the mobile payment service 438 (or an electronic marketplace associated with the mobile payment service 438), or with a webpage associated with the business location. After the application has been installed, the customer 430 may configure the application by adjusting one or more personal settings and/or preferences. At 406, the point-of-sale device 434 may communicate with the mobile payment service 438 to login and authenticate its identity. In some examples, the mobile payment service 438 may receive unique identifying information from the point-of-sale device 434 capable of identifying the point-of-sale device 434 and a business location associated with the point-of-sale device 434. The business location associated with the point-of-sale device 434 may utilize the mobile payment service 438 to handle a portion of its payment-related operations. For example, the mobile payment service 438 may process those payments that are initiated using the techniques describe herein. In some examples, the mobile payment service 438 may handle other operations, such as targeted advertising to the customer 430 on the mobile device 432, mobile messaging between the mobile device 432 and the business location, communications between the mobile device 932 and the mobile payment service 438, and other similar operations related to mobile payment processing. At 408, the customer 430 may login and authenticate the application of the mobile device 432 with the mobile payment service 438. For example, when the mobile payment service 438 is associated with an electronic marketplace, the customer 430 may provide his or her electronic marketplace login information. In some examples, the login information may be related to the particular business location.

Next, at 410, the beacon may provide a proximity broadcast of beacon information. At 412, mobile device 432 may detect a proximity broadcast from the beacon 436. In some examples, a background listener of an application running on the mobile device 432 may be configured to periodically, continually, and/or occasionally check for a broadcast. Once the proximity broadcast is detected, the mobile device 432 may provide a communication to the customer 430 indicating that beacon information has been detected. For example, the communication may welcome the customer 430 to a particular business location and ask whether the customer 430 would like to check in at the particular business location. The customer 430 may then select whether he or she wishes to check in at the location associated with the beacon information by making a selection on the mobile device 432. At 414, the mobile payment service 438 may receive an indication of the selection from the mobile device 432 indicating that a check-in has been requested. The mobile payment service 438 may update a list of checked-in customers and share the list with the point-of-sale device 434.

In this manner, both the point-of-sale device 434 and the mobile payment service 438 may have a current list of checked-in customers.

Meanwhile, the customer 430 may place an order at the business location. In some examples, placing an order with the business location may include placing an order with a human user, by using a device configured to receive an order, via the mobile device 432, or using any other suitable method for placing an order. An order may include, placing an order for an item, selecting an item for purchase, selecting an item for rental or use, and other similar interactions that may result in an order being transacted. At 418, an in-person exchange of the goods and/or services of the order is performed. For example, a human user may deliver a dinner order to the customer 430, which may be associated with a bill. The order may have been entered by the human user at the point-of-sale device 434 and used to coordinate the order from the customer 430. At 420, the point-of-sale device 434 may send a bill total associated with the bill to the mobile payment service 438. The bill total may include the items ordered by the customer 430 and entered into at the point-of-sale device 434 by the human user. At 422, the mobile payment service 438 may provide the bill or an indication of the bill to the mobile device 432. In some examples, the bill or indication of the bill provided to the mobile device 432 may include the bill total and a tip amount. The tip amount may be included by the mobile payment service 438 in accordance with one or more defaults or preferences set by the customer 430 or set by the mobile payment service 438. For example, the customer 430 may have earlier indicated that a default tip of 15% should be added to all bills. In this manner, the bill provided to the mobile device 432 at 422 may represent the total amount owed by the customer to settle the transaction. In some examples, the mobile device 432 may provide a communication to the mobile payment service 438 indicating the tip amount. At 424, the mobile device 432 may provide a communication to the mobile payment service 438 requesting to divide a bill associated with the order. For example, the customer 430 may include a plurality of customers and the order may include an order for the plurality of customers, including a plurality of goods. In this example, the mobile payment service 438 may communicate with the mobile device 432 (and other mobile devices) to coordinate how the bill is to be divided. For example, a bill may be divided in equal parts (e.g., in thirds for three customers), on an item-by-item basis (e.g., three items to customer 1 and two items to customer 2), on a cost basis (e.g., $25 for customer 1 and $35 for customer 2), on a shared-item basis (e.g., an appetizer may be split equally, while other items are divided differently), and any combination of the foregoing. In some examples, the bill may be divided in accordance with one or more defaults or preferences set by the customer 430 or the mobile payment service 438. For example, a preference may indicate that a particular division of the bill when certain users request to split the bill. Imagine a scenario where a father (e.g., the customer 430) indicates via a preference that when he and his son (e.g., a second customer) divide a bill, it should be allocated as follows: 80% of the bill total to the father and 20% to the son. Alternatively, the preference may indicate that the son will be responsible for the tip portion of the bill and the father will be responsible for the remaining portion. In some examples, the mobile device 432 may provide an indication of the tip amount along with a request to divide or may provide the indication of the tip amount on its own. In some examples, the point-of-sale device 434 may provide a communication to the mobile payment service 438 requesting to divide a bill associated with the order. At 426, the mobile payment service 438 may provide an indication of the division. In some examples, providing the indication may include sending a payment request or payment notification to each of the mobile devices associated with the order. The payment request or payment notification may include the amount of the bill attributed to the particular customer, the bill total, and other amounts attributed to other customers. The payment request or payment notification may also include details about ordered or purchased items.

At 428, the mobile device 432 may detect that it is no longer within the range of the beacon 436. This may be achieved, for example, by the mobile device 432 no longer receiving, via its listener(s), the proximity broadcast. Next, at 440, the mobile device 432 may provide an indication to the mobile payment service 438 that the mobile device 432 has checked out from the business location. Checking out may happen automatically once the customer 430 moves beyond the signal radius of the beacon 436. However, in some examples, the customer 430 may be prompted on the mobile device 432 to decide whether the customer 430 wishes to checkout from the business location. At 442, the mobile payment service 438 may settle a transaction with the customer 430. Settling a transaction may include automatically debiting an account of the customer 430 (and the accounts of other customers), charging a charge card of the customer 430 (and charge cards of other customers), and other similar methods of receiving payment from the customer 430 (and other customers) for the items purchased or ordered from the business location. Thus, settling the transaction with the customer 430 (and other customers) may include processing payment transactions from one or more customers (e.g., the customer 430 and other customers). At 444, the mobile payment service 438 may settle a transaction with the business location. Settling a transaction with the business location may include providing a single payment to the business location, via the point-of-sale device 434, representative of the bill total for the order. In other words, while the bill may have been divided among more than one customer, the business location may nevertheless receive a single payment for the order.

In some examples, a customer may request a refund contest a charge. In some examples, the customer may inform a proprietor of a business location that a refund is wanted or that the customer is contesting a charge. A refund request may be entered at a point-of-sale device associated with the business location and sent to a mobile payment service. The mobile payment service, in turn, may resolve the refund by adjusting an account of the customer. In some examples, the customer may file a refund claim with the mobile payment service using the mobile application, a web application, or a browser application. Upon receiving the refund claim, the mobile payment service may resolve the refund claim using customary methods.

Figure 5:
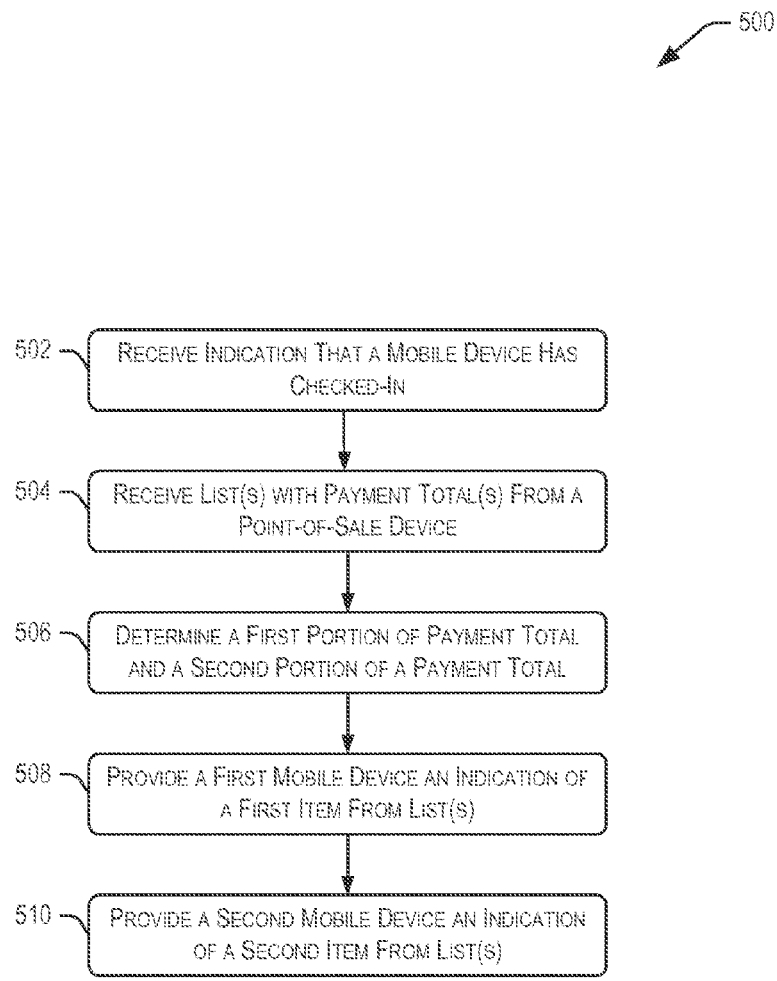
FIG. 5 is a flow diagram depicting example acts for implementing techniques relating to proximity-based mobile device payments as described herein, according to at least one example.

Turning next to example acts and/or procedures that may be performed using techniques described herein, in accordance with at least one example. FIG. 5 depicts process 500 including example acts for techniques relating to proximity-based mobile device payments in accordance with at least one example. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The payment management module 228 (FIG. 2) of the mobile payment service 202 (FIG. 2) may perform the process 500 of FIG. 5. The process 500 begins at 502 by receiving an indication that a mobile device has checked in. In some examples, receiving an indication that a mobile device has checked in may be performed by the communication component 304 (FIG. 3). Receiving an indication that a mobile device has checked in may include receiving one or more service calls from an application of the mobile device requesting that the mobile device (and its customer) be added to a list of checked-in customers of a location. For example, the list may include those customers currently checked-in at the location, previously checked-in at the location, and other similar configurations of checked-in customers. In some examples, receiving an indication may include receiving an indication based at least in part on a mobile device receiving beacon information from a beacon associated with a particular location. At 504, the process 500 receives list(s) with payment total(s) from a point-of-sale device. In some examples, receiving list(s) with payment total(s) may be performed by the communication component 304. Receiving list(s) with payment totals from a point-of-sale device may include receiving a list indicating items ordered by a customer associated with a mobile device. The list indicating the items ordered by the customer may be entered at the point-of-sale device by a worker associated with the location. In some examples, the list may be populated by the customer using the mobile device and provided to the point-of-sale device which, in turn, provides the list. The list(s) may include payment totals (e.g., the total amount owed for items included on the list). At 506, the process 500 determines a first portion of payment total and a second portion of a payment total. In some examples, determining a first portion of a payment total and a second portion of a payment total may be performed by the management component 308 (FIG. 3). Determining a first portion of a payment total and determining a second portion of a payment total may include receiving information from at least one mobile device indicating that a payment total be divided into at least a first portion and a second portion. For example, a customer, utilizing a mobile device, may indicate to a mobile payment service that certain items from a list of items be divided among a plurality of customers. Determining the first portion and the second portion may include processing the indications from the customer (and other customers) and verifying accounts (or payment instruments) associated with the customers (e.g., ability to settle bill, whether accounts or instruments have adequate funds, whether accounts or instruments have adequate funds above a threshold, and other similar verification measures). In this manner, the mobile payment service may determine whether payment using the mobile payment service is available and allowed for a given customer. At 508, the process 500 provides a first mobile device an indication of first items from list(s). In some examples, providing a first mobile device an indication of first items from list(s) may be performed by the communication component 304. Providing a first mobile device indication may include providing an indication as a representation of the item—e.g., text, an image, a photograph, or any combination of the foregoing. The first mobile device may display the indication on a user interface of the first mobile device. Thus, a user of the mobile device may be enabled to view items from the list associated with the first mobile device. At 510, the process 500 provides a second mobile device an indication of second items from list(s). In some examples, providing a second mobile device an indication of second items from list(s) may be performed by the communication component 304 and in a similar manner as at 508. In some examples, providing a second mobile device may include providing in response to an input at the second mobile device. For example, the first mobile device may send a communication to the mobile payment service requesting that a bill be divided. The mobile payment service may then provide the first mobile device with information that may be shared with other mobile devices (e.g., the second mobile device), authenticated by the mobile payment service, and evidencing an intent of the other mobile devices to assume responsibility for a portion of the bill. The information may include, for example, an alphanumeric code, a word or phrase, a user-determined word or phrase, or other information capable of being authenticated by the mobile payment service. In some examples, the information may be shared orally, via an electronic communication, via a near field transfer, via a bump transfer, via a low energy transfer mechanism, or by using some other appropriate transfer procedure.

Figure 6:
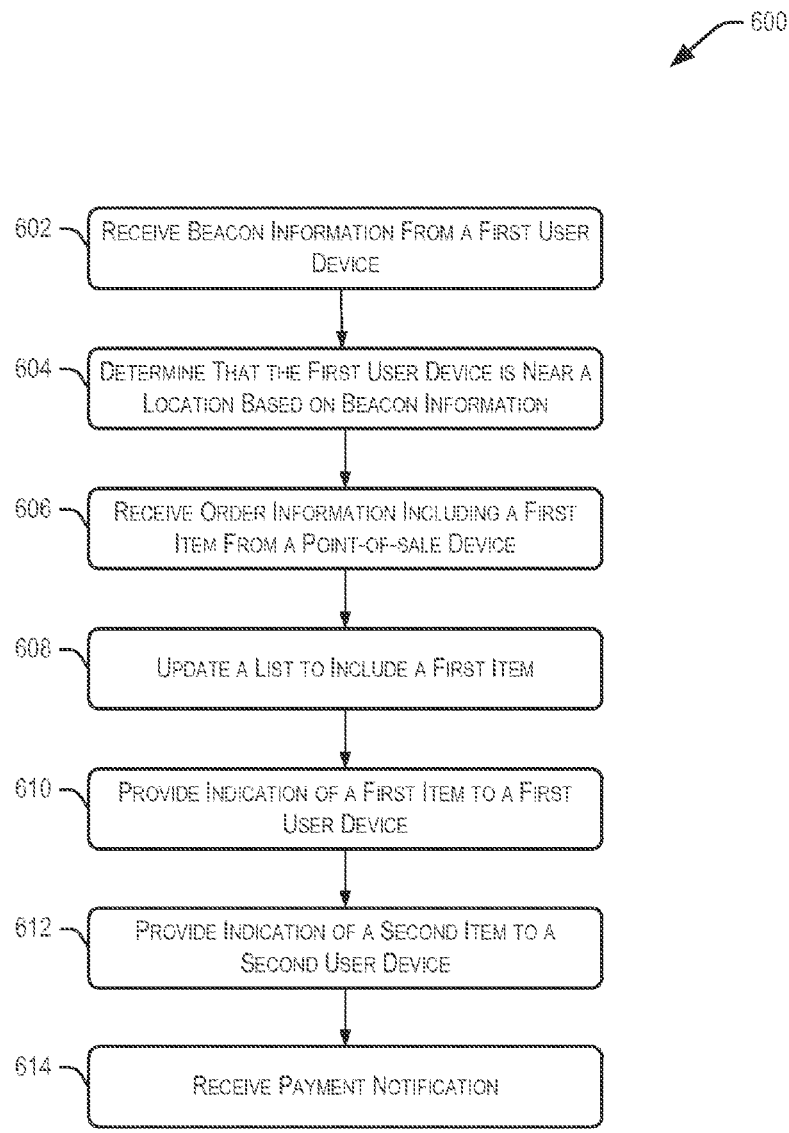
FIG. 6 is a flow diagram depicting example acts for implementing techniques relating to proximity-based mobile device payments as described herein, according to at least one example.

Turning next to example acts and/or procedures that may be performed using techniques described herein, in accordance with at least one example. FIG. 6 depicts process 600 including example acts for techniques relating to proximity-based mobile device payments in accordance with at least one example. The payment management module 228 (FIG. 2) of the mobile payment service 202 (FIG. 2) may perform the process 600 of FIG. 6. The process 600 begins at 602 by receiving beacon information from a first user device. In some examples, receiving beacon information may be performed by the communication component 304 (FIG. 3). At 604, the process 600 determines that the first user device is near a location based on beacon information. In some examples, determining that a first user device is near a location based on beacon information may be performed by the management component 308 (FIG. 3). Determining that first a user device is near a location may include processing beacon information to determine location information. The location information may be compared to information from a data structure storing location-based information for a plurality of locations. In this manner, the process 600 may determine that first user is near location. At 606, the process 600 receives order information including a first item from a point-of-sale device. In some examples, receiving order information may be performed by the communication component 304. Receiving order information may include receiving information representative of a portion of an order entered at the point-of-sale device. At 608, the process 600 updates a list to include a first item. In some examples, updating a list to include a first item may be performed by the management component 308. Updating a list to include a first item may include maintaining a list associated with the customer. The list may, in some examples, be similar to a tab or order and may be maintained by the mobile payment service. At 610, the process 600 provides an indication of a first item to a first user device. In some examples, providing indication of a first item may be performed by the communication component 304. Providing an indication of first item may include providing an indication as a representation of the item—e.g., text, an image, a photograph, or any combination of the foregoing. The first user device may display the indication on a user interface of the first user device. Thus, a user of the first user device may be enabled to view items from the list associated with the first user device. At 612, the process 600 provides an indication of a second item to a second user device. In some examples, providing an indication of a second item may be performed by the communication component 304. Providing an indication of a second item to a second user device may be performed in a similar manner as 610. At 614, the process 600 receives payment notification. In some examples, receiving payment notification may be performed by the communication component 304. Receiving payment notification may include receiving payment notification from at least one of the first user device or the second user device. The payment notification may indicate that the first user device, the second user device, or a combination of both is paying for a portion of a bill associated with the first item and the second item.

Figure 7:
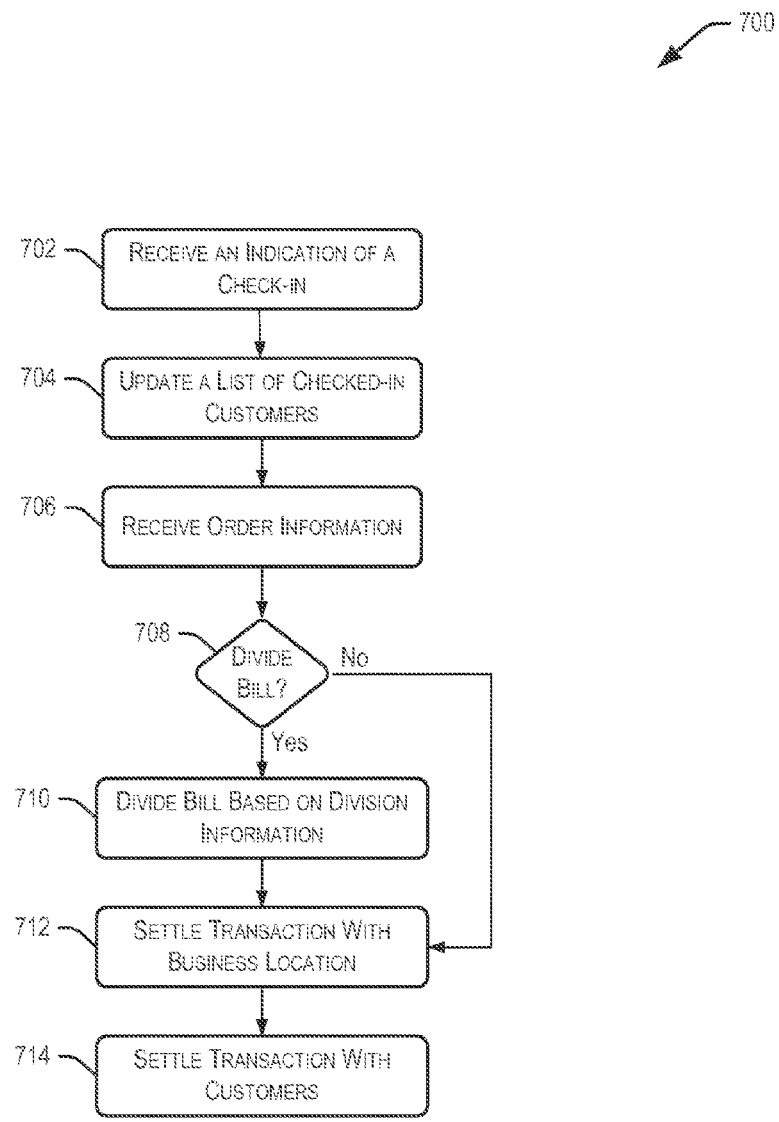
FIG. 7 is a flow diagram depicting example acts for implementing techniques relating to proximity-based mobile device payments as described herein, according to at least one example.

Turning next to example acts and/or procedures that may be performed using techniques described herein, in accordance with at least one example. FIG. 7 depicts process 700 including example acts for techniques relating to proximity-based mobile device payments in accordance with at least one example. The payment management module 228 (FIG. 2) of the mobile payment service 202 (FIG. 2) may perform the process 700 of FIG. 7. The process 700 begins at 702 by receiving an indication of a check-in. In some examples, receiving an indication of a check-in may be performed by the communication component 304 (FIG. 3). Receiving an indication of a check-in may include receiving an indication from a mobile device that the mobile device is located at or near a business location. In some examples, receiving an indication of a check-in may be performed remotely. For example, using a mobile device, computer, laptop, or other similar device a remote customer may check in at a business location while not physically located at or near the business location. Such an arrangement may be desirable to allow the remote customer to participate in the techniques described herein. For example, the remote customer may be enabled to pay for the order or a portion of an order on behalf of other customers. In some examples, a customer may check in at the business location by accessing a kiosk or other device within the business location and indicating that the customer would like to check in. In some examples, the customer may check in by requesting that a worker associated with the business location check the user in using a point-of-sale device—or other suitable device. At 704, the process 700 updates a list of checked-in customers. In some examples, updating a list of checked-in customers may be performed by the management component 308 (FIG. 3). Updating a list of checked-in customers may include updating the list to include customers from 702. In other words, once a customer checks in at a location, a list associated with that location may be updated to include the customer. At 706, the process 700 receives order information. In some examples, receiving order information may be performed by the communication component 304. Receiving order information may include receiving information indicating one or more items ordered by a customer at a business location. For example, if the business location were a coffee shop, the order information may indicate that the customer ordered a coffee and a breakfast sandwich and may also indicate the cost for individual items. The order information may also include a total associated with the particular order (e.g., the total for the coffee and breakfast sandwich). In some examples, the customer may request that certain items be prepared by the business location prior to the user arriving (e.g., checking in) at the business location. The customer may also indicate, via one or more defaults or preferences, that the customer desires to be automatically charged once the customer picks the items up from the business location and may indicate a default tip amount for the services. For example, a customer may preorder his or her morning coffee such that it is ready at a certain period of time. The order information may then be received after the customer has picked up the coffee. The payment for the coffee may be settled by the customer's mobile device communicating with the mobile payment system and the mobile payment system paying the coffee shop. Thus, in accordance with techniques described herein, the transaction for coffee may be executed without the user needing to interact with the user device or a point-of-sale device associated with the coffee shop. In this manner, the transaction may be executed with "zero-clicks." In some examples, the customer may settle the transaction for the coffee without preordering. For example, the mobile device may automatically check in as the user enters the coffee shop. Next, the customer may order his or her coffee. And, after receiving his or her coffee, the customer may leave the coffee shop without providing payment to the barista. Instead, the payment transaction may be executed by the mobile device communicating with the mobile payment service automatically. Settling the payment may also include settling a tip amount. At 708, a decision is made whether to divide a bill. Whether to divide a bill may be determined by the management component 308. In some examples, determining whether to divide a bill may include receiving one or more requests to divide a bill. For example, a request may come from a customer who is checked-in at the business location. A request may also come from a remote user, whether or not the remote user is checked-in at the business location. For example, imagine a scenario where a manager desires to pay for a work lunch for subordinates, but the manager cannot attend. The manager may provide an indication to the mobile payment system of this desire. Thus, while the subordinates may order food in a typical manner, the business location may provide the bill to the mobile payment service to settle the transaction with the manager. If the bill is not to be divided (whether with a remote user or otherwise), then the process 700 proceeds to 712. If the bill is to be divided (whether with a remote user or otherwise), then the process 700 proceeds to 710. At 710, the process 700 divides the bill based on division information. In some examples, dividing the bill may be performed by the management component 308. Dividing the bill may include receiving division information from mobile devices indicating how the bill is to be divided. For example, the division information may indicate items per customer, amount per customer, percentage per customer, and any combination of the foregoing. At 712, the process 700 settles the transaction with the business location. In some examples, settling the transaction with the business location may be performed by the settlement component 310 (FIG. 3). Settling the transaction with the business location may include providing the business location with a single payment totaling the amount of the bill. In some examples, such settling may include depositing the single amount in an account associated with the business location. At 714, the process 700 settles the transaction with the customers. In some examples, settling the transaction with the customers may be performed by the settlement component 310. Settling the transaction with the customers may include settling multiple transactions with multiple customers. In some examples, the number of customers may depend on the number of divisions at 710. Settling the transaction may include charging or otherwise debiting accounts of customers the amounts associated with the customers' respective divisions.

Figure 8:
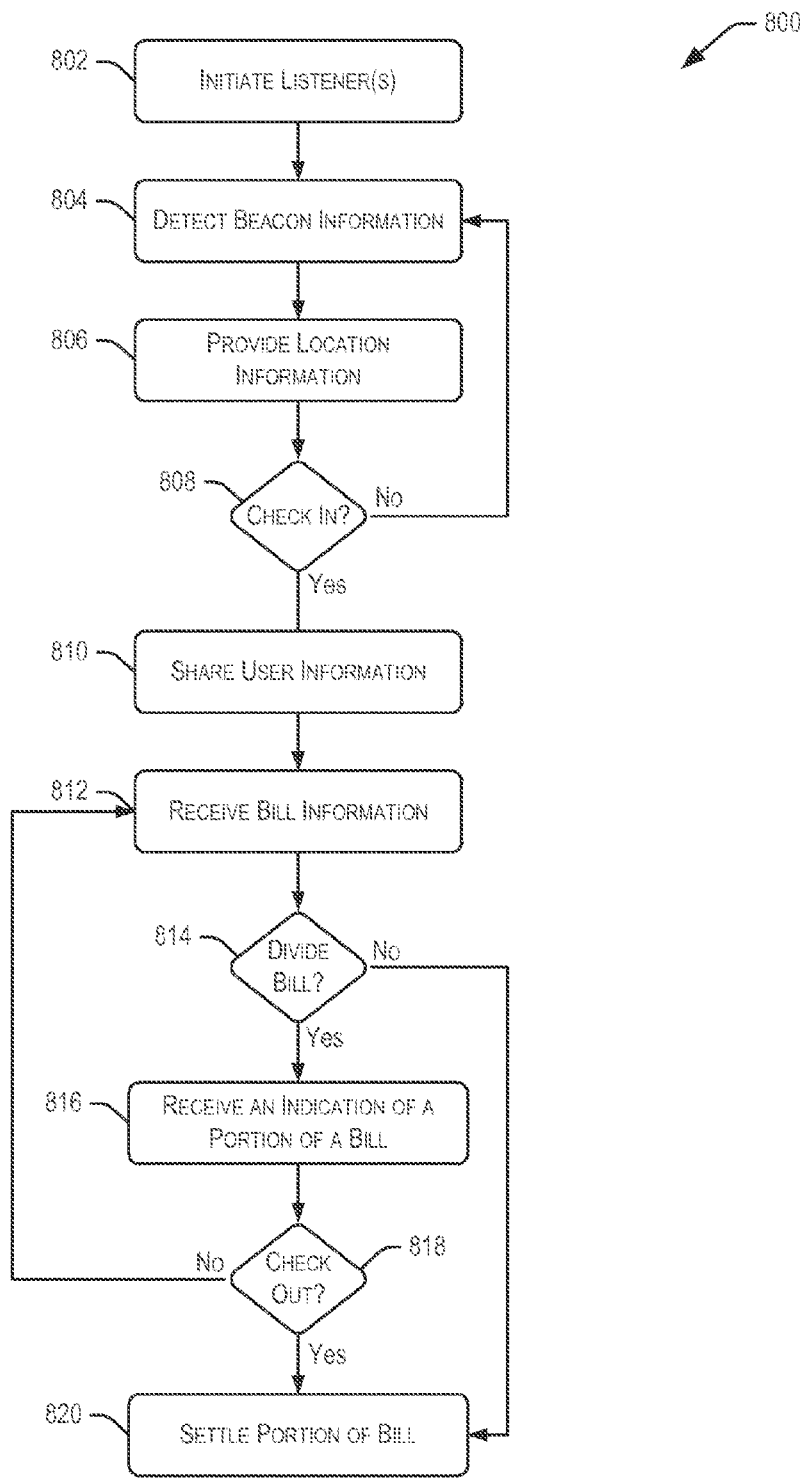
FIG. 8 is a flow diagram depicting example acts for implementing techniques relating to proximity-based mobile device payments as described herein, according to at least one example.

Turning next to example acts and/or procedures that may be performed using techniques described herein, in accordance with at least one example. FIG. 8 depicts process 800 including example acts for techniques relating to proximity-based mobile device payments in accordance with at least one example. The payment application 222 (FIG. 2) of the user device 208 (FIG. 2) may perform the process 800 of FIG. 8. The process 800 begins at 802 by initiating listener (s). In some examples, initiating listeners may include authorizing a mobile application to listen for beacon information. At 804, the process 800 detects beacon information. In some examples, detecting beacon information may include receiving beacon information via one or more listeners. The beacon information may be used by a mobile device to make a call to a mobile payment service to determine a location associated with the beacon information. In some examples, the beacon information may be used by the mobile device to determine the location (without calling the mobile payment service). In some examples, the beacon information may include an identification element. At 806, the process 800 provides location information. In some examples, providing location information may include the mobile device providing location information based in part on the detected beacon information. At 808, a determination is made whether to check in at the business location. In some examples, the determination may be resolved by a user of the mobile device by selecting on a user interface of the mobile device, whether or not to check in. Checking in at a location may allow the user to receive one or more benefits, including utilizing the techniques for proximity-based mobile device payments described herein. If the answer at 808 is no, then the process 800 returns to 804 to detect beacon information. If the answer at 808 is yes, then the process 800 proceeds to 810 where user information is shared. In some examples, sharing user information may including sharing user information with a point-of-sale device via the mobile payment service. In this manner, the customer may be enabled to check in at the location or be associated with a bill by the point-of-sale device. Once the bill is associated with the customer, it may be difficult for the customer to check out without first paying for the bill. In some examples, the customer may go through a cancellation process in order to cancel the bill. At 812, the process 800 receives bill information. In some examples, receiving bill information may include receiving information indicating items ordered by the user of the mobile device. At 814, a determination is made whether to divide the bill. In some examples, the user of the mobile device may determine whether to divide the bill by considering whether there are other users that can pay for a portion of the bill. If the answer at 814 is no, then the process 800 proceeds to 820 to settle the appropriate portion of the bill. If the answer at 814 is yes, then the process 800 proceeds to 816 where an indication of a portion of the bill is received. In some examples, receiving an indication of a portion of the bill may include receiving an indication of the portion of the bill for which the user of the mobile device is responsible. This portion may include items, a portion of items, a percentage of the bill total, a straight division of the bill total, or otherwise indicate a portion of the bill. At 818, a determination is made whether to check out. In some examples, the determination of whether to check out is made when the listener(s) no longer receive the beacon information associated with the checked-in location. In some examples, the user will be automatically checked out or prompted whether he or she wishes to check out after the listeners have not received the beacon information for a particular period of time. For example, if the listeners have not received beacon information for the checked-in location for five minutes, then the process 800 may prompt the user to determine whether he or she desires to check out. In some examples, once the user settles his or her portion of the bill (e.g., 820), the user's mobile device may check out of the location. If the answer at 818 is no, then the process 800 returns to 812 to receive bill information. If the answer at 818 is yes, then the process 800 continues to 820 to settle the portion of the bill. In some examples, settling the portion of the bill may include providing payment authorization from the user of the mobile device to a mobile payment service. Such authorization may be provided prior to the settlement of the bill or in connection with each settlement. In some examples, the payment authorization may be based in part on a default or preference. For example, the customer may indicate that for certain locations, the customer desires automatic payment. However, for other locations, the customer desires to provide authorization for each transaction.

Figure 9:
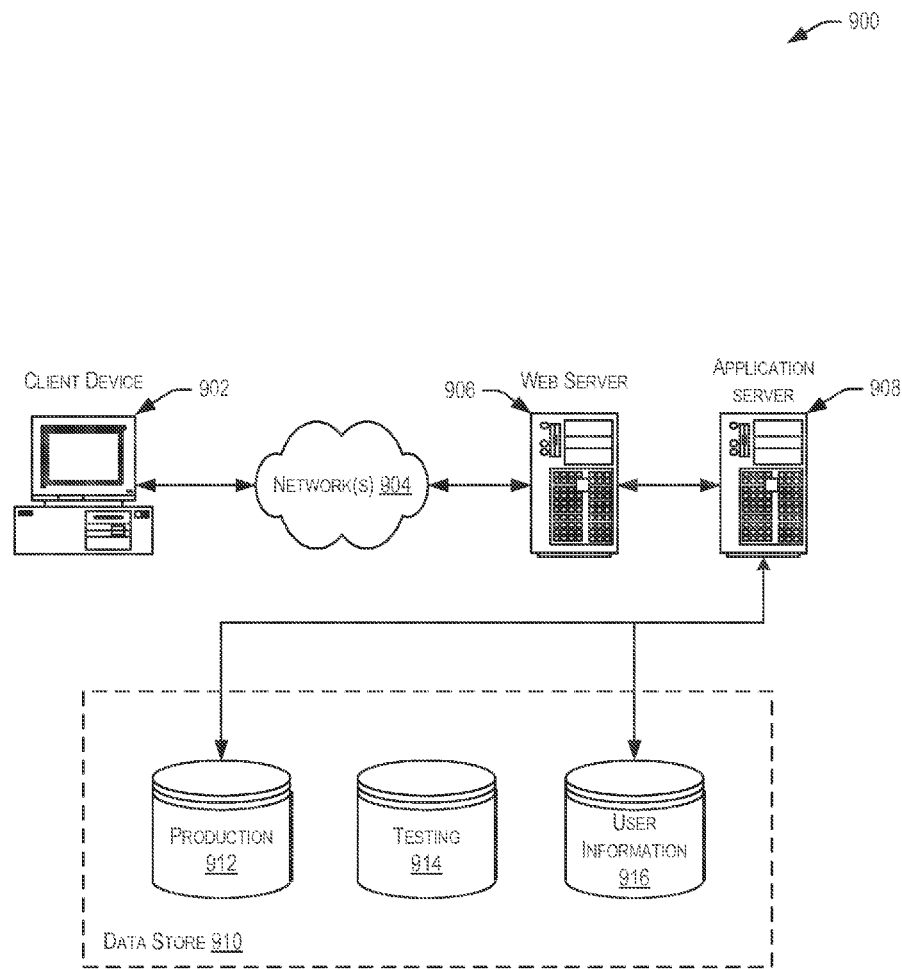
FIG. 9 is an example schematic environment for implementing techniques relating to proximity-based mobile device payments as described herein, according to at least one example.

FIG. 9 illustrates aspects of an example schematic environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any suitable device operable to send and receive requests, messages, or information over a suitable network 904 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for accessing requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access write information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology. Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y. and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    receiving, by a computer system of a payment service, location information from a first user device, the location information generated by a global positioning sensor of the first user device and comprising information about a dynamic geographic location of the first user device that changes with respect to movements of the first user device;
    receiving, by the computer system, a check-in request from the first user device;
    determining, by the computer system, that the first user device is located within a threshold distance of a business location based at least in part on the location information and the check-in request, the first user device being unable to check in at the business location while the first user device is located outside the threshold distance from the business location;
    receiving order information from an electronic transaction terminal associated with the business location, the order information indicating a first item, the first user device being distinct from the electronic transaction terminal and other electronic devices associated with the business location;
    in response to receiving the order information, updating, by the computer system, a list of items to include the first item;
    providing, based in part on the order information, an indication of at least the first item to the first user device while the first user device is located within the threshold distance of the business location;
    providing, based at least in part on the order information, an indication of at least a second item to a second user device that is located within the threshold distance of the business location; and
    receiving a payment notification from at least one of the first user device or the second user device.

2. The computer-implemented method of claim 1, further comprising receiving order information for a shared item from the electronic transaction terminal.

3. The computer-implemented method of claim 2, further comprising:
    updating the list of items to include the shared item;
    providing, based at least in part on the updated list of items, an indication of at least the shared item to the first user device; and
    providing, based at least in part on the updated list of items, an indication of at least the shared item to the second user device, payment for the shared item divided between the first user device and the second user device.

4. The computer-implemented method of claim 1, wherein receiving the check-in request includes receiving a check-in indication from the first user device and updating a check-in list associated with the business location to include the first user device.

5. The computer-implemented method of claim 4, wherein receiving the payment notification from at least one of the first user device or the second user device includes receiving a first payment notification from the first user device, and the method further comprising:
    after receiving the first payment notification from first user device, receiving a check-out indication from the first user device, the check-out indication indicating that the first user device is no longer located within the threshold distance of the business location.

6. The computer-implemented method of claim 5, wherein receiving the check-out indication is dependent on the first user device no longer detecting beacon information from a beacon associated with the business location.

7. The computer-implemented method of claim 1, wherein the electronic transaction terminal comprises a point-of-sale device, the business location comprises a restaurant, and the order information comprises an order for one or more items from the restaurant, and wherein the point-of-sale device is configured to receive the order as one or more inputs by a human user at the point-of-sale device.

8. The computer-implemented method of claim 1, wherein providing the indication of at least the second item to the second user device is in response to a user of the second user device taking one or more actions with respect to the second user device.

9. The computer-implemented method of claim 8, wherein the one or more actions taken with respect to the second user device include at least one of inputting information at a user interface of the second user device, passing the second user device near the first user device, or touching a portion of the second user device to a portion of the first user device.

10. The computer-implemented method of claim 1, further comprising:
    authorizing a first debit of at least an amount corresponding to the first item from a first user account, the first user account associated with the first user device;

authorizing a second debit of at least an amount corresponding to the second item from a second user account, the second user account associated with the second user device; and authorizing a payment corresponding to the list of items to the electronic transaction terminal.

11. The computer-implemented method of claim 1, wherein receiving the payment notification from at least one of the first user device or the second user device comprises receiving the payment notification after at least one of the first user device or the second user device is no longer located within the threshold distance of the business location.

12. One or more non-transitory computer-readable storage devices for storing computer-executable instructions that, when executed by one or more computer systems, configure the one or more computer systems to perform operations comprising:

receiving, by a payment service, location information from a first user device, the location information generated by a global positioning sensor of the first user device and comprising information about a dynamic geographic location of the first user device that changes with respect to movements of the first user device;

receiving, by the payment service, a check-in request from the first user device;

determining, by the payment service, that the first user device is located within a threshold distance of a business location based at least in part on the location information and the check-in request, the first user device being unable to check in at the business location while the first user device is located outside the threshold distance from the business location;

receiving order information from an electronic transaction terminal associated with the business location, the order information indicating a first item, the first user device being distinct from the electronic transaction terminal and other electronic devices associated with the business location;

in response to receiving the order information, updating, by the payment service, a list of items to include the first item;

providing, based in part on the order information, an indication of at least the first item to the first user device while the first user device is located within the threshold distance of the business location;

providing, based at least in part on the order information, an indication of at least a second item to a second user device that is located within the threshold distance of the business location; and receiving a payment notification from at least one of the first user device or the second user device.

13. The one or more non-transitory computer-readable storage devices of claim 12, wherein the instructions further configure the one or more computer systems to perform operations comprising, in response to receiving the payment notification:

authorizing a first debit corresponding to the first item from a first user account, the first user account associated with the first user device; or authorizing a second debit corresponding to the second item from a second user account, the second user account associated with the second user device.

14. The one or more non-transitory computer-readable storage devices of claim 12, wherein the order information is received within a method call from the electronic transaction terminal, instructions for making the method call provided by the payment service.

15. The one or more non-transitory computer-readable storage devices of claim 12, wherein receiving the payment notification from at least one of the first user device or the second user device comprises receiving the payment notification after at least one of the first user device or the second user device is no longer located within the threshold distance of the business location.

16. The one or more non-transitory computer-readable storage devices of claim 12, the instructions further configure the one or more computer systems to perform operations comprising:

authorizing a first debit of at least an amount corresponding to the first item from a first user account, the first user account associated with the first user device;

authorizing a second debit of at least an amount corresponding to the second item from a second user account, the second user account associated with the second user device; and authorizing a payment corresponding to the list of items to the electronic transaction terminal.

17. A system comprising:

memory that stores computer-executable instructions; and at least one processor configured to access the memory and execute the computer-executable instructions to collectively at least:

receive location information from a first user device, the location information generated by a global positioning sensor of the first user device and comprising information about a dynamic geographic location of the first user device that changes with respect to movements of the first user device;

receive a check-in request from the first user device;

determine, based at least in part on the location information and the check-in request, that the first user device is located within a threshold distance of a business location, the first user device being unable to check in at the business location while the first user device is located outside the threshold distance from the business location;

receive order information from an electronic transaction terminal associated with the business location, the order information indicating a first item, the first user device being distinct from the electronic transaction terminal and other electronic devices associated with the business location;

in response to receiving the order information, update a list of items to include the first item;

provide, based in part on the order information, an indication of at least the first item to the first user device while the first user device is located within the threshold distance of the business location;

provide, based at least in part on the order information, an indication of at least a second item to a second user device that is located within the threshold distance of the business location; and receive a payment notification from at least one of the first user device or the second user device.

18. The system of claim 17, further comprising a beacon configured to transmit beacon information within a geographic boundary corresponding to the business location, and wherein determining that the first user device is located within the threshold distance of the business location is further based at least in part on receiving an acknowledgement from the first user device indicating that the first user device detected the beacon information.

19. The system of claim 18, wherein:

the acknowledgement is a first acknowledgment; and the system includes further executable instructions that, when executed by the processor, cause the system to at least:

receive a second acknowledgement that the first user device has checked out of the business location, the second acknowledgment generated by the first user device based at least in part on a listener of the first user device not receiving the beacon information for a predetermined period of time; and at least in response to receiving the second acknowledgement, authorizing a first debit corresponding to the first item from a first user account associated with the first user device.

\* \* \* \* \*